United States Patent
Tan et al.

(10) Patent No.: US 7,960,471 B1
(45) Date of Patent: Jun. 14, 2011

(54) NANOCOMPOSITES FROM IN-SITU POLYMERIZATION OF 3-PHENOXY-BENZOIC ACID IN THE PRESENCE OF VAPOR-GROWN CARBON NANOFIBERS

(75) Inventors: Loon-Seng Tan, Centerville, OH (US); Jong-Beom Baek, Junggu Ulsan (KR)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 516 days.

(21) Appl. No.: 12/231,423

(22) Filed: Aug. 28, 2008

Related U.S. Application Data

(63) Continuation-in-part of application No. 10/963,469, filed on Oct. 12, 2004, now abandoned.

(51) Int. Cl.
*B32B 9/00* (2006.01)

(52) U.S. Cl. ........ 524/877; 568/300; 977/733; 977/783; 977/896; 977/897

(58) Field of Classification Search .................. 524/877; 568/300; 977/733, 783, 896, 897
See application file for complete search history.

(56) References Cited

U.S. PATENT DOCUMENTS

2003/0158323 A1* 8/2003 Park et al. ...................... 524/495

OTHER PUBLICATIONS

Making Functional Materials with Nanotubes: "Carbon-nanofibre-filled thermoplastic composites"; Materials Research Society Symposium Proceedings (2002), 706, 105-110.*
"Synthesis of poly(ether-ketones) and a poly(ether-sulfone) using polyphosphoric acid/P2O5 as polymerization medium"; Polymer Preprints (American Chemical Society, Division of Polymer Chemistry) (2002), 43(1), 533-534.*

* cited by examiner

*Primary Examiner* — Kelechi C Egwim
(74) *Attorney, Agent, or Firm* — AFMCLO/JAZ; Bart Hersko

(57) ABSTRACT

A poly(ether-ketone) composite of the formula:

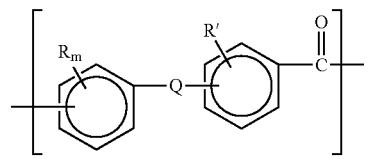

wherein CNF is carbon nanofibers and MWNT is multi-walled carbon nanotubes; wherein Ar represents ether-ketone repeating groups of the formula $$\left[ \begin{array}{c} R_m \\ \phantom{x} \end{array} \hspace{-6pt} \underset{}{\bigcirc} \hspace{-4pt} - Q - \hspace{-4pt} \underset{R'}{\bigcirc} \hspace{-6pt} \overset{O}{\underset{\|}{C}} - \right]$$

wherein Q is —O— or —O—$(CH_2)_n$—O—, wherein n has a value of 2-12; wherein R is —H, —$CH_3$, or —$C_2H_5$, m has a value of 1 or 2; wherein R' is —H or —$CH_3$; and wherein — denoted the presence of a direct C—C bond between Ar and CNF or MWNT$_g$ Also provided is a process for preparing the composite.

3 Claims, No Drawings

NANOCOMPOSITES FROM IN-SITU POLYMERIZATION OF 3-PHENOXY-BENZOIC ACID IN THE PRESENCE OF VAPOR-GROWN CARBON NANOFIBERS

CROSS REFERENCE TO RELATED APPLICATION

This application is a Continuation-In-Part of application Ser. No. 10/963,469, filed Oct. 12, 2004 now abandoned.

RIGHTS OF THE GOVERNMENT

The invention described herein may be manufactured and used by or for the Government of the United States for all governmental purposes without the payment of any royalty.

BACKGROUND OF THE INVENTION

The present invention relates to compositions of matter for thermoplastic nanocomposites containing nanoscale carbon fibers and tubes.

One-dimensional, carbon-based, nano-structured materials are generally divided into three categories based on their diameter dimensions: (i) single-wall carbon nanotubes (SWNT, 0.7-3 nm); (ii) multi-wall carbon nanotubes (MWNT, 2-20 nm); (iii) carbon nanofibers (CNF, 40-100 nm). While the length of carbon nanofiber) ranges 30-100 μm, it is difficult to determine the lengths of SWNT and MWNT because of their strong proclivity to aggregate (to form "ropes"), but they are generally considered to be two-orders of magnitude shorter than CNF. In comparison to single-walled or multi-walled carbon nanotubes, vapor-grown carbon nanofibers are more attractive from the standpoint of practicality in terms of their relatively low cost and availability in larger quantities as the result of their more advanced stage in commercial production. These nanofibers are typically produced by a vapor-phase catalytic process in which a carbon-containing feedstock (e.g. $CH_4$, $C_2H_4$ etc.) is pyrolyzed in the presence of small metal catalyst (e.g. ferrocene, $Fe(CO)_5$ etc.) and have an outer diameter of 60-200 nm, a hollow core of 30-90 nm, and length on the order of 50-100 microns. It follows that having aspect ratios (length/diameter) of greater than 800 should make them useful as nano-level reinforcement for polymeric matrices. Furthermore, since their inherent electrical and thermal transport properties are also excellent, there are many possibilities imaginable for tailoring their polymer matrix composites into affordable, light-weight, multifunctional materials. Conceptually, there are three general techniques for dispersing chemically unmodified VGCNF in the polymer matrices: (1) melt blending (2) solution blending, and (3) reaction blending. For the reaction blending route, there are two scenarios: (a) in-situ polymerization of monomers (AB) or co-monomers (AA+BB) in the presence of dispersed VGCNF that occurs without forming any covalent bonding between the VGCNF and the matrix polymer, or (b) in-situ grafting of AB monomers that occurs with direct covalent bonds formed between the VGCNF and the matrix polymer. While melt-blending is perhaps the most cost effective approach to VGCNF-based nanocomposites, and has been applied to thermoplastic, thermosetting and elastomeric matrices, the resulting nano-composite materials are by and large less than optimal, especially in the cases where polymer-VGCNF incompatibility adversely impact the desired level of dispersion and the breakage of the carbon nanofibers by high shear forces reduce the reinforcing aspect ratios. The solution blending appears to have circumvented these problems, for example, the nano-composite materials produced by this route have shown 2-3 orders of magnitude higher in electrical conductivity and much lower percolation threshold (<1 vol %) than similar materials prepared by the melt-blending route. To our knowledge, we are not aware of any report in the literature that describes successful preparation of VGCNF-based nanocomposite materials via reaction blending. However, similar non-grafting, reaction blending processes have been reported for unmodified SWNT and $MWNT_g$. In addition, there are reports on the grafting of a polymer either to or from a SWNT or MWNT that typically involved prior oxidation or functionalization of the CNT with a reactive group (e.g. surface-bound acid chloride or initiator for atom-transfer radical polymerization).

Using Friedel-Crafts acylation, Applicants were able to chemically attach meta-poly(etherketone) onto the surfaces of VGCNF, viz. forming direct bonds between the polymer grafts and VGCNF, via in-situ polymerization of m-phenoxybenzoic acid in the presence of VGCNF in poly(phosphoric acid).

Accordingly, it is an object of the present invention to provide new in-situ nanocomposites derived from carbon nanofibers and carbon multiwalled nanotubes.

It is another object of the present invention to provide a process for attaching a poly(ether-ketone) onto the surfaces of nanoscale carbon fibers and tubes.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a poly(ether-ketone) composite of the formula:

Ar-carbon nanofibers or multi-walled carbon nanotubes wherein Ar represents ether-ketone repeating groups of the formula

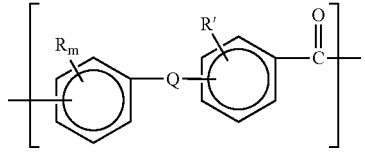

wherein Q is —O— or —O—$(CH_2)_n$—O—, wherein n has a value of 2-12; wherein R is —H, —$CH_3$, or —$C_2H_5$, m has a value of 1 or 2; wherein R' is —H or —$CH_3$; and wherein — denotes a direct C—C bond between Ar and carbon nanofibers or multi-walled carbon nanotubes.

Also provided is a process for preparing the above composite.

DETAILED DESCRIPTION OF THE INVENTION

The composite of this invention is prepared by reacting an aromatic acid of the formula

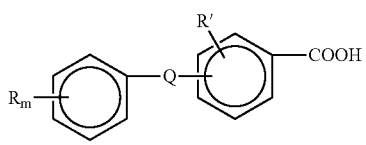

wherein R, R', m and Q are as described above, with a nanoscale carbon fiber or tube in polyphosphoric acid (PPA), as described below.

Suitable aromatic acids useful in this reaction include 3-phenoxybenzoic acid, 4-phenoxybenzoic acid, 3-(2,6-dimethylphenoxy)benzoic acid, 3-phenoxy-2-methylbenzoic acid, and the like.

Attachment of the poly(ether-ketone) onto the surfaces of nanoscale carbon fibers and tubes is conducted in polyphosphoric acid (PPA). Preliminarily it is helpful to describe the chemistry of phosphoric acids and strong phosphoric acids or polyphosphoric acids as follows: As used herein the term "phosphoric acid(s)" means commercial phosphoric acid(s) containing 85-86% $H_3PO_4$. The strong phosphoric acids, or polyphosphoric acids referred to as PPA (polyphosphoric acid) are members of a continuous series of amorphous condensed phosphoric acid mixtures given by the formula

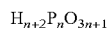

or

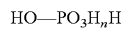

where the value of n depends on the molar ratio of water to phosphorus pentoxide present.

In its most general definition, polyphosphoric acid composition can range from distributions where the average value of n is less than unity, giving rise to a mobile liquid, to high values of n, where the polyphosphoric acid is a glass at normal temperatures. Because the species of polyphosphoric acid are in a mobile equilibrium, a given equilibrium composition can be prepared in many ways. For instance, the same distribution or polyphosphoric acid composition could be prepared by either starting with concentrated orthophosphoric acid ($H_3PO_4$, n=1) and driving off water or by starting with phosphorus pentoxide ($P_2O_5$) and adding an appropriate amount of water.

All polyphosphoric acid compositions can be described as a ratio of $P_2O_5$ and water by reducing the various species present (on paper) to $P_2O_5$ and water. We will then use the convention that polyphosphoric acid composition will be expressed in terms of a $P_2O_5$ content (as a percentage) defined as $P_2O_5$ content =(weight of $P_2O_5$)/(weight of $P_2O_5$+weight of water)×100.

Thus, the $P_2O_5$ content of pure orthophosphoric acid could be derived by reducing one mole of $H_3PO_4$ to 0.5 moles $P_2O_5$+1.5 moles $H_2O$. Converting to weights gives the $P_2O_5$ content as (0.5*142)/((0.5*142)+(1.5*18.01))*100%=72.4%.

Similarly, the $P_2O_5$ content of commercial polyphosphoric acid can be derived in the following way. Polyphosphoric acid is available commercially in two grades, 105% and 115%. These percentages refer to $H_3PO_4$ content, which means that 100 g of the two grades contain 105 and 115 grams of $H_3PO_4$. The $P_2O_5$ content of 115% polyphosphoric acid can then be calculated knowing the $P_2O_5$ content of 100% $H_3PO_4$.

(115 g/100 g)*72.4%=83.3%

The polymerization is conducted in polyphosphoric acid (PPA) at a polymer concentration of about 5 weight percent at a temperature of about 130° C. The acid, nanoscale carbon fibers or tubes, and PPA (83% assay) are combined and stirred with dried nitrogen purging at about 130° C. for about 3 hours. Additional $P_2O_5$ is then added in one portion; and heating is continued, with stirring for about 24-60 hours. The reaction product is then precipitated from the PPA reaction solution with water or other polymer nonsolvent. The amount of $P_2O_5$ added is optimized at 25 wt % of the PPA used at the beginning of the reaction, leading to a total $P_2O_5$ content of about 86.7%.

The following examples illustrate the invention:

Example 1

Into a 250 mL resin flask equipped with a high torque mechanical stirrer, and nitrogen inlet and outlet, 3-phenoxybenzoic acid (2.7 g, 12.6 mmol), and VGCNF (Applied Science Inc., Cedarville, Ohio; 0.3 g), and PPA (83% assay, 60 g) was placed and stirred with dried nitrogen purging at 130° C. for 3 h. $P_2O_5$ (15.0 g) was then added in one portion. The initially dark mixture became lighter and viscous after 1 h at 130° C. and started to stick to the stirring rod. The temperature was maintained at 130° C. for 48 h. At the end of the reaction, water was added into the flask. The resulting purple polymer product was poured into a Warring blender and the polymer bundles were chopped, collected by suction filtration, washed with diluted ammonium hydroxide, then Soxhlet-extracted first with water for three days and then with methanol for another three days, and finally dried over phosphorous pentoxide under reduced pressure (0.05 mmHg) at 140° C. for 72 h to give the polymeric product in quantitative yield. Anal. Calcd. for $C_{14.76}H_8O_2$; C, 81.56%; H, 3.71%; O, 14.73%. Found: C, 81.40%; H, 3.61%; O, 13.16%.

Example 2

Various polymerizations were carried out with different ratios of the AB-monomer, 3-phenoxybenzoic acid (PBA) and VGCNF using the procedure given in Example 1. The results of these polymerizations are given in Table 1:

TABLE 1

| Feed | | Calculated[a] | | Found[b] | | | Elemental Analysis | | | |
|---|---|---|---|---|---|---|---|---|---|---|
| VGCNF (wt %) | PBA (wt %) | VGCNF (wt %) | mPEK (wt %) | VGCNF (wt %) | $[\eta]^c$ (dL/g) | | C (%) | H (%) | O (%) |
| 30 | 70 | 31.9 | 68.1 | 31.7 | — | Calcd[d] | 86.08 | 2.81 | 11.11 |
| | | | | | | Found | 84.14 | 3.21 | 9.79 |
| 20 | 80 | 21.4 | 78.6 | 20.5 | — | Calcd[d] | 83.95 | 3.23 | 12.81 |
| | | | | | | Found | 83.64 | 3.19 | 11.88 |
| 10 | 90 | 10.8 | 89.2 | 11.4 | — | Calcd[d] | 81.78 | 3.67 | 14.54 |
| | | | | | | Found | 81.40 | 3.61 | 13.16 |
| 5 | 95 | 5.4 | 94.6 | 5.6 | 1.73 | Calcd[d] | 80.68 | 3.89 | 15.42 |
| | | | | | | Found | 80.21 | 4.19 | 14.48 |

TABLE 1-continued

| Feed | | Calculated[a] | | Found[b] | | | Elemental Analysis | | |
|---|---|---|---|---|---|---|---|---|---|
| VGCNF (wt %) | PBA (wt %) | VGCNF (wt %) | mPEK (wt %) | VGCNF (wt %) | $[\eta]^c$ (dL/g) | | C (%) | H (%) | O (%) |
| 2 | 98 | 2.2 | 97.8 | 2.0 | 1.00 | Calcd[d] | 80.02 | 4.03 | 15.95 |
| | | | | | | Found | 80.06 | 4.17 | 15.07 |
| 1 | 99 | 1.1 | 98.9 | 1.2 | 1.42 | Calcd[d] | 79.80 | 4.07 | 16.13 |
| | | | | | | Found | 79.91 | 4.25 | 15.11 |

[a]Calculation based on the assumption that VGCNF is 100% C and the molar mass of the repeat unit of mPEK ($C_{13}H_8O_2$) is 196.20.
[b]Residual weight percent at 650° C. from TGA thermograms in helium.
[c]Intrinsic viscosity measured in MSA at 30.0 ± 0.1° C.
[d]Empirical formulas derived from the molar ratios of VGCNF:mPEK, i.e. C: $C_{13}H_8O_2$ are as follows: (30/70) $C_{20.64}H_8O_2$; (20/80) $C_{17.46}H_8O_2$; (10/90) $C_{14.98}H_8O_2$; (5/95) $C_{13.94}H_8O_2$; (2/98) $C_{13.96}H_8O_2$; (1/99) $C_{13.18}H_8O_2$.

Example 3

The glass transition temperatures ($T_g$'s) of PEK's containing VGCNF were determined by DSC. The DSC scans were run on the powder samples after they had been heated to 200° C. in the DSC chamber and allowed to cool to ambient temperature under nitrogen purge. The $T_g$ was taken as the midpoint of the maximum baseline shift from the second run. PEK without VGCNF displayed a $T_g$ at 136.6° C. As the VGCNF content increased, polymer $T_g$'s gradually increased to 138.2° C. with VGCNF 10 wt % and to 144.0° C. with VGCNF 20%. The TGA experiments on the powder sample of pure VGCNF indicated that the temperatures at which a 5% weight loss ($T_{d5\%}$) occurred at 682.7° C. in air and 696.8° C. in helium. All other PEK's with and without VGCNF displayed higher $T_{d5\%}$ in the range of 408-448° C. in air and 365-409° C. in helium. Char percents at 650° C. in air are in excellent agreement with the amounts of VGCNF present during PEK polymerization. Thermal properties of PEK's and VGCNF are shown in Table 2:

TABLE 2

| Product | | Tg | | TGA | | | |
|---|---|---|---|---|---|---|---|
| | | | | | In Air | | In Helium |
| VGCNF (wt %) | mPEK (wt %) | DSC (° C.) | TMA (° C.) | $T_{d5\%}$ (° C.) | Char At 650° C. (%) | $T_{d5\%}$ (° C.) | Char At 650° C. (%) |
| 100.0 | 0.0 | ND | ND | 682.7 | 98.2 | 696.8 | 96.7 |
| 31.9 | 68.1 | 157.6 | 164.2 | 448.2 | 31.7 | 409.0 | 68.6 |
| 21.5 | 78.5 | 151.8 | 153.9 | 408.6 | 20.5 | 388.6 | 63.1 |
| 10.8 | 89.2 | 143.7 | 145.4 | 430.5 | 11.4 | 406.8 | 55.3 |
| 5.4 | 94.6 | 143.7 | 141.2 | 492.4 | 5.6 | 479.9 | 61.9 |
| 2.2 | 97.8 | 141.0 | 138.5 | 485.7 | 2.0 | 478.0 | 53.7 |
| 1.1 | 98.9 | 142.5 | 141.5 | 477.5 | 1.2 | 463.1 | 54.6 |
| 0.0 | 100.0 | 136.6 | 137.1 | 414.2 | 0.8 | 365.6 | 48.3 |

Degree of Polymerization (DP) for the mPEK grafts. Based on the assumptions that the functionalization of VGCNF via Friedel-Crafts acylation reaction in PPA:$P_2O_5$ (w/w 4:1) medium could result in arylcarbonylation of three carbon in every hundred carbon sites and the arylcarbonylation reaction is most likely to occur at the $sp^2C$—H defect sites, the upper-limit values for the DP were determined and molecular weight of each VGCNF-bound mPEK, ranging from DP of 4 with the corresponding MW of 862 Da. to DP of 168 and MW of 32,935 Da. The computation algorithm (footnote) and results are shown in Table 3.

TABLE 3

| Sample | wt % (CNF/mPEK)[a] | Mol. CNF[b] | Mol. mPEK[b] | Mol. Grafting Sites[c] | mPEK DP/chain[d] | mPEK MW/chain[e] |
|---|---|---|---|---|---|---|
| 30/70 | 31.7/68.3 | 2.642 | 0.348 | 0.0793 | 4 | 862 |
| 20/80 | 20.5/79.5 | 1.708 | 0.405 | 0.0513 | 8 | 1,551 |
| 10/90 | 11.4/88.6 | 0.950 | 0.452 | 0.0285 | 16 | 3,109 |
| 5/95 | 5.6/94.4 | 0.467 | 0.481 | 0.0140 | 34 | 6,743 |
| 2/98 | 2.0/98.0 | 0.167 | 0.499 | 0.0050 | 100 | 19,601 |
| 1/99 | 1.1/98.8 | 0.100 | 0.504 | 0.0030 | 168 | 32,935 |

[a]TGA (air) data
[b]For a 100-g sample, mol (CNF) = wt (CNF)/12.00 and mol (mPEK) = wt (mPEK)/196.20 (FW $C_{13}H_8O_2$).
[c]Total number of grafting sites (mol.): mol. (CNF) × 0.03 based on the assumption that there are 3 arylcarbonylation sites for every 100 carbons of the VGCNF.
[d]Degree of polymerization (DP)/chain = mol (grafting sites)/mol (CNF)
[e]MW (mPEK) = DP × 196.20 (FW $C_{13}H_8O_2$).

Having thus described exemplary embodiments of the present invention, it should be noted by those skilled in the art that the disclosures herein are exemplary only and that alternatives, adaptations and modifications may be made within the scope of the present invention.

We claim:

1. A poly(ether-ketone) composite of the formula:

wherein CNF is carbon nanofiber, MWNT is multi-walled carbon nanotube, wherein Ar represents ether-ketone repeating groups of the formula

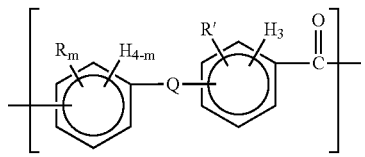

wherein Q is —O— or —O—$(CH_2)_n$—O—, wherein n has a value of 2-12; wherein R is —H, —$CH_3$, or —$C_2H_5$, m has a value of 1 or 2; wherein R' is —H or —$CH_3$; and wherein— denotes the presence of a direct C—C bond between Ar and CNF or MWNT.

2. The composite of claim 1 wherein Q is —O—, R is —H, m is 2 and R' is —H.

3. A process for preparing a poly(ether-ketone) composite of the formula

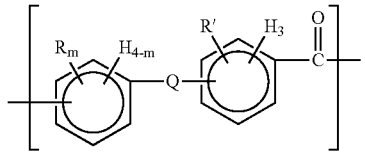

wherein Ar represents ether-ketone repeating groups of the formula

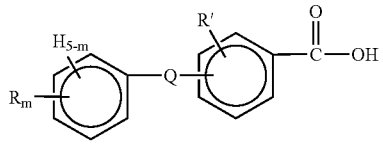

wherein Q is —O— or —O—$(CH_2)_n$—O—, wherein n has a value of 2-12; wherein R is —H, —$CH_3$, or —$C_2H_5$, m has a value of 1 or 2; wherein R' is —H or —$CH_3$; and wherein — denotes the presence of a direct C—C bond between Ar and CNF or MWNT, which comprises the steps of (a) combining an aromatic acid of the formula wherein R, R', m and Q are as described above, nanoscale carbon fibers or multi-walled carbon tubes, and 83% PPA, (b) stirring this mixture at about 130° C. for about 3 hours, (c) adding additional $P_2O_5$ equivalent to 25 wt % of 83% PPA used, leading to a total $P_2O_5$ content of about 86.7%, and (d) continuing to heat the mixture with stirring for about 24-60 hours, and (e) recovering the reaction product.

\* \* \* \* \*